United States Patent [19]

Noonan

[11] Patent Number: 5,505,432
[45] Date of Patent: Apr. 9, 1996

[54] "FISH TAPES" AND ANTI-SNAGGING DEVICES THEREFOR

[76] Inventor: Robert J. Noonan, 1166 Seymore Ave., Cincinnati, Ohio 45216

[21] Appl. No.: 167,088

[22] Filed: Dec. 16, 1993

[51] Int. Cl.⁶ ................................................ F21C 29/16
[52] U.S. Cl. ................................................ 254/134.3 FT
[58] Field of Search ............... 254/134.3 R, 134.3 FT, 254/134.4, 134.7; 15/104.04, 104.05, 104.16, 104.3 SN

[56] References Cited

U.S. PATENT DOCUMENTS

| | | | |
|---|---|---|---|
| 400,958 | 4/1889 | Seely | 254/134.7 |
| 2,750,151 | 6/1956 | Fowler et al. | 254/134.3 FT |
| 4,002,817 | 1/1977 | DeGrado | 254/134.3 R |
| 4,527,775 | 7/1985 | Flowers | 254/134.3 FT |

FOREIGN PATENT DOCUMENTS 102357  9/1962  Netherlands ............. 254/134.3 FT

*Primary Examiner*—Robert C. Watson
*Attorney, Agent, or Firm*—Kinney & Schenk

[57] ABSTRACT

A "fish tape" for installing electrical conductors in conduits is provided with an anti-snagging device. The anti-snagging device comprises a spherical roller to forms the leading portion of the "fish tape" as it is fed into a conduit. The roller "rides over" discontinuities in the conduit that would otherwise interfere with the "fish tape" being fed through the conduit and then retracted therefrom.

10 Claims, 4 Drawing Sheets

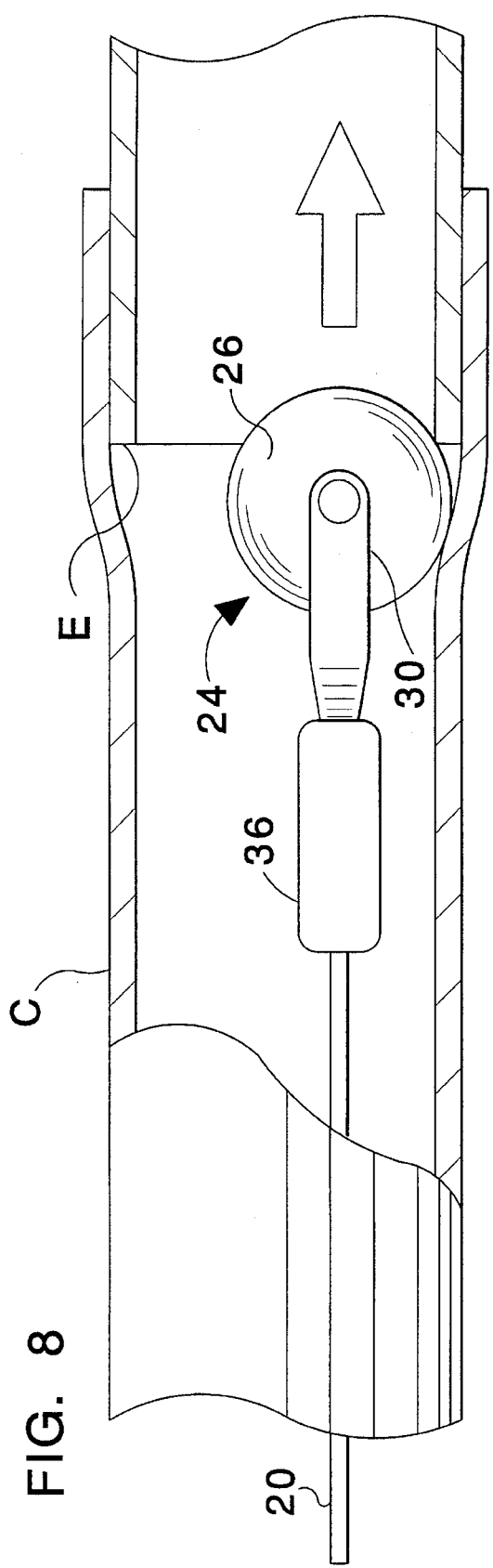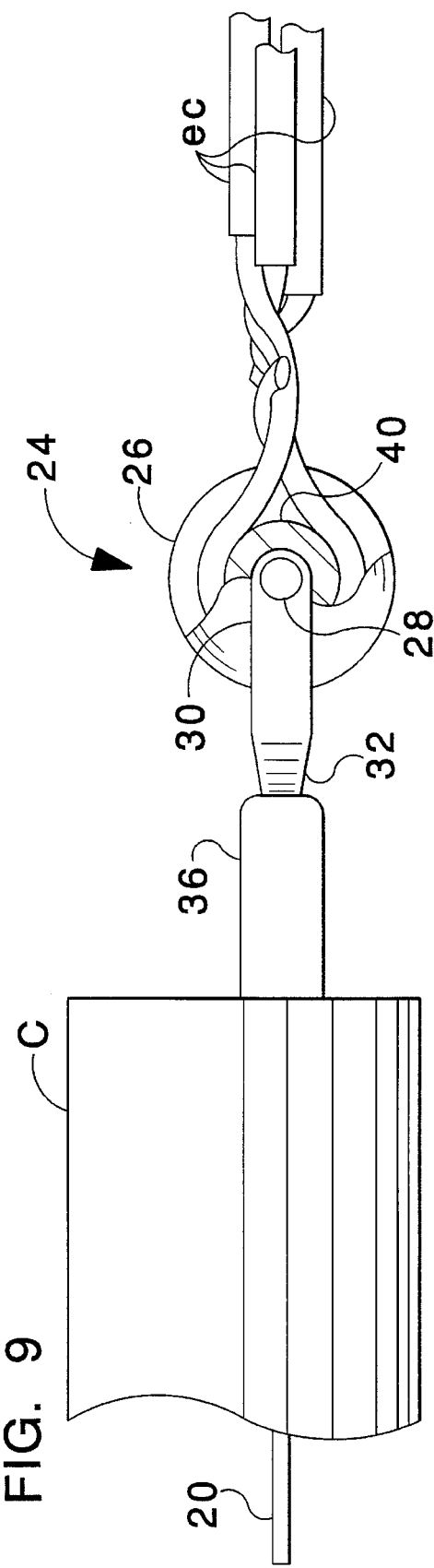

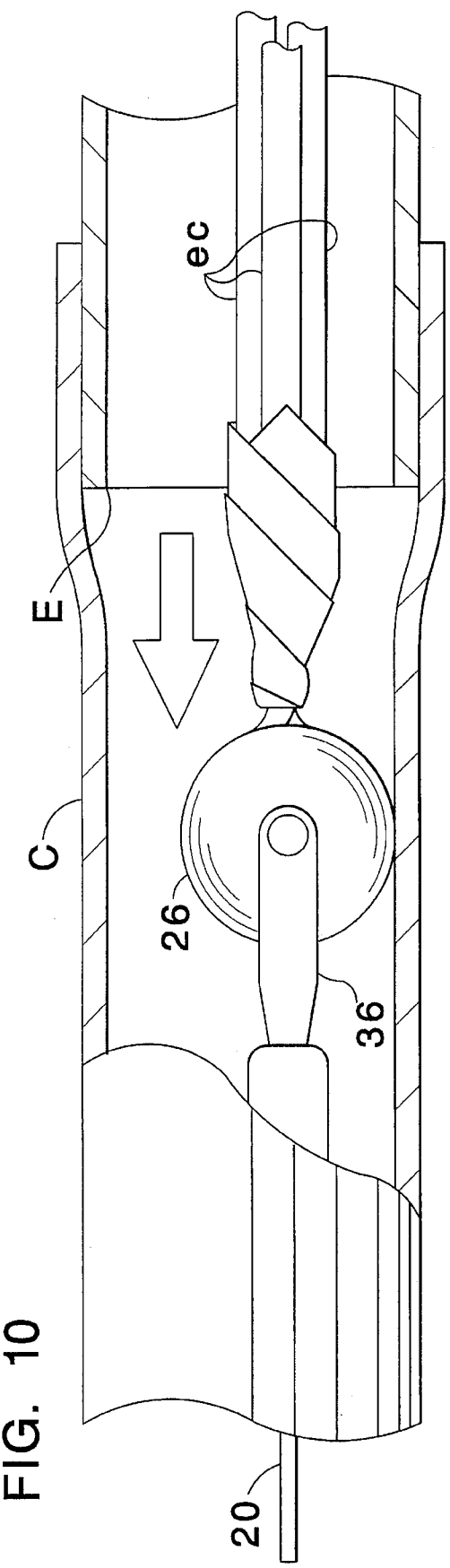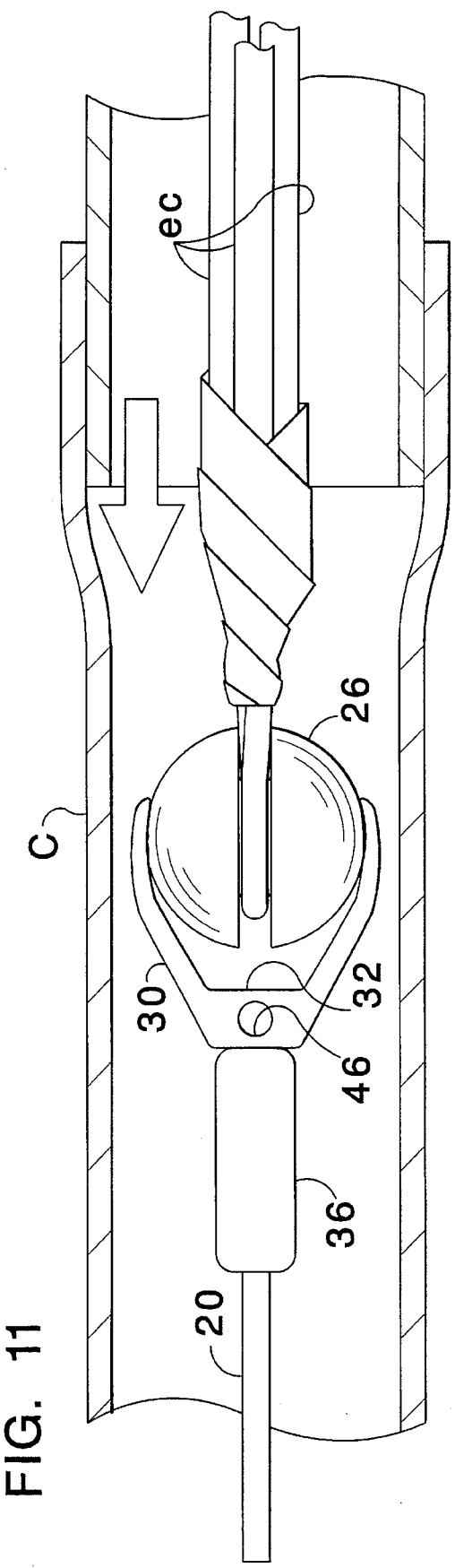

"FISH TAPES" AND ANTI-SNAGGING DEVICES THEREFOR

The present invention relates to improvements in "fish tapes" employed in inserting elongated items into protective conduits and more particularly to anti-snagging devices therefor as well as improved methods of using same.

The term "fish tape" is commonly employed to designate an elongated, resilient wire that is employed in installing electrical conductors in metal conduits to provide what is referenced as "hard wiring".

In the installation of "hard wiring", the "fish tape" is pushed from one end of the conduit to its opposite end. An electrical conductor can be secured, as by adhesive tape to the "fish tape". The "fish tape" thus carries the conductor with it, as it is pushed through the conduit. When the conductor is pushed beyond the opposite end of the conduit, it can be detached from the "fish tape", and the "fish tape" withdrawn to complete installation of that conductor in the conduit.

Alternatively, the "fish tape" may be first pushed through to the opposite end of the conduit. The electrical conductor can then be secured, by adhesive tape, or be small wires, to the end of the "fish tape". The "fish tape" is then retracted through the conduit, pulling the conductor with it, to thereby install the conductor in the conduit. The "fish tape" is, of course, released from the conductor, after it has been retracted from the entry end of the conduit into which it was first introduced.

A "fish tape" wire is formed of a resilient material, typified by spring steel. It has a cross section that is sufficiently small that it may be stored in coil form have a relatively small diameter, say 6 to 14 inches. This characteristic enables the "fish tape" to be inserted through conduits several feet in length and around curves or elbows of relatively small radius.

At this point it will be noted that "fish tapes" are employed in the installation of various types of lines, or elongated items, in various types of protective conduits. The reference herein to "hard wiring" installations is exemplary. The same principles are involved in the installation of lines such as plastic tubing are other types of electrical wiring. The protective conduit can take various forms other than the metal tubing used in "hard wiring" and can be formed of sections of polyvinylchloride plastics or can take the form of the hollow wall of a building.

A longstanding problem in the use of "fish tapes" is that they jam when being fed through a conduit. One cause of such jamming is that the leading end of the "fish tape" engages, i.e., catches or snags, on a protrusion or other discontinuity in the conduit. The "fish tape" does not have sufficient column strength to continue movement toward the opposite end of the conduit. Continued feed pressure on the "fish tape" causes it to bow within the conduit and a jam occurs. Frequently, discontinuities along the surface of a conduit are caused by the use of multiple lengths of tubing that are joined to compositely form a protective conduit of substantial length.

Jamming also occurs in attempting to push a "fish tape" through a conduit in which one or more conductors have already been installed. The leading end of the "fish tape" can catch on these previously installed conductors and cause a jam. In other cases, jams can occur when it is attempted to advance the leading end of a "fish tape" past a curve in the conduit, as at an elbow.

In most instances, it is possible to manipulate the "fish tape" so that it is freed from whatever it is snagged on, and the "fish tape" can then be fed to the opposite, exit end of the conduit to complete the installation of the conductor involved.

However, at best, such jamming of the "fish tape" is both time consuming and vexatious. At worst, jamming can necessitate reconstruction of the conduit, to eliminate the cause of the snag, or replacement of the conduit with a larger diameter conduit, and/or removal and reinstallation of conductors, or other elongated items, that have been previously installed.

Accordingly, it is the object of the present invention to minimize, if not eliminate, the problem of jamming in the use of "fish tapes".

The foregoing end is attained by an anti-snagging device which forms a structural component of the "fish tape" and which may also be provided as a separate item that is to be mounted on the "fish tape".

Characterized as a "fish tape" comprising a wire adapted to be inserted through a conduit from an entry end to an exit end and then retracted from the exit end to the entry end in the installation of an elongated item. This "fish tape" is characterized by an anti-snagging device comprising roller means mounted on the "fish tape" tape wire and forming the leading end of the "fish tape". The roller means are rotatable about an axis transverse to the length of the "fish tape" wire, to thereby provide a means for riding over discontinuities along the interior surface of the conduit.

The anti-snagging device may be further characterized by a yoke having arms between which the roller means is disposed and on which the roller is journaled. Additionally the yoke may have a central base from which the yoke arms project. Also the anti-snagging device may comprise a stem extending from the yoke base, longitudinally of the "fish tape" wire. Means are then provided for securing the stem to the "fish tape" wire.

In one form of the invention the "fish tape" wire comprises a mounting cylinder secured to an end portion of the wire. This mounting cylinder has a longitudinal bore aligned with the wire. The stem of the anti-snagging device is releasably secured in said bore.

In another form of the invention the "fish tape" wire has a hook at an end portion thereof. Attachment of the anti-snagging device is achieved by means of an opening disposed centrally of said bridge and through which the wire hook is engaged to provide a mechanical lock, in a longitudinal direction, between the wire and the yoke. A tape wrapping may then be employed to hold the stem in alignment with the "fish tape" wire.

Another feature of the anti-snagging device is found in the provision of spherical roller means and forming a groove circumferentially of the spherical roller means.

This groove affords an improved method of installing elongated items in the conduit. Thus when the "fish tape" has been fed from an entry end to and beyond an exit end, the elongated item to be installed, can be looped around the groove to facilitate its attachment to the "fish tape" for retraction to the entry end of the conduit.

The above and other related objects and features of the invention will be apparent from a reading of the following description of preferred embodiments of the invention and the novelty thereof pointed out in the appended claims.

In the drawings:

FIG. 8 is an elevation of the anti-snagging device, as shown in FIG. 4, illustrating its use as the "fish tape" is pushed through the joint of a conduit, with the conduit being partially broken away and in section;

FIG. 9 illustrates, in elevation, the leading end of the "fish tape" projected through and beyond an end of the conduit and positioned for attachment of electrical conductors thereto;

FIG. 10 illustrates, in elevation, the leading end of the "fish tape" being retracted through the conduit to install electrical conductors therein; and FIG. 11 is a plan view of the showing of FIG. 10.

As indicated above, a "fish tape" takes various forms, but, basically comprises a length of resilient (typically spring steel) wire. The wire generally has a rectangular cross section, which facilitates its being wound into coil form. Various means are provided for maintain the "fish tape" in coil form, such a reel or a casing in which the coil is disposed. Generally speaking the coil will have a diameter between 6 and 14 inches, the diameter being dependent on the cross sectional dimensions of the wire. The diameter is larger enough so that there "fish tape" will not be stressed beyond its elastic limit and permanently curved, when stored in coil form.

Figure 1:
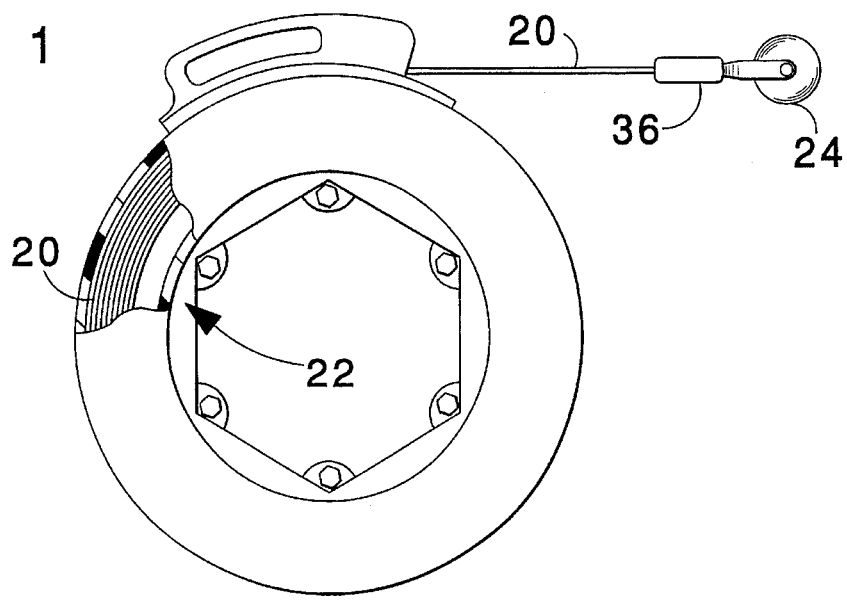
FIG. 1 illustrates a conventional "fish tape", in coil form, with an end portion unwound therefrom and with an anti-snagging device of the present invention mounted thereon.

FIG. 1 illustrates a "fish tape" wire 20 which is wound into coil form on a reel 22. One end of the "fish tape" wire 20 is shown partially unwound from the reel 22. A anti-snagging device 24 is mounted on the partially unwound, leading end of the wire 20.

Figure 2:
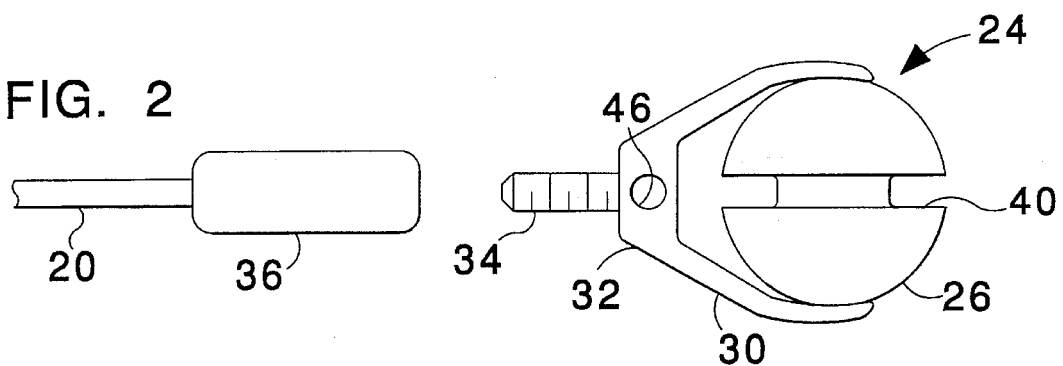
FIG. 2 is a plan view of the anti-snagging device positioned to be mounted on the leading end of a "fish tape"
Figure 3:
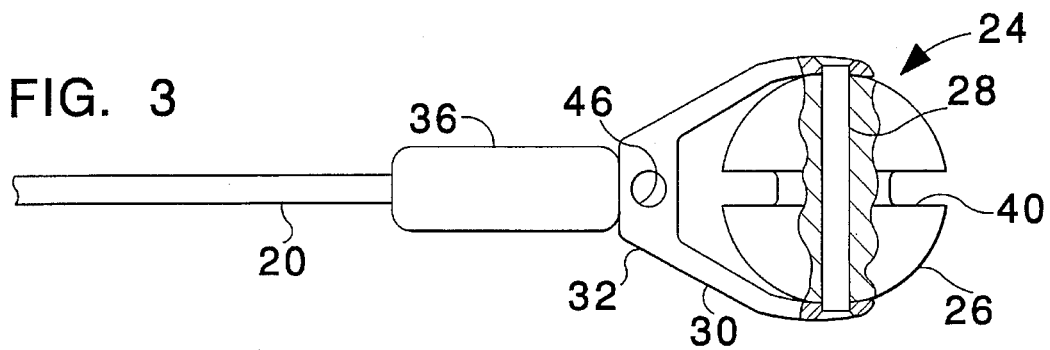
FIG. 3 is a plan view of the anti-snagging device of FIG. 2 after being mounted on the "fish tape", with portions of the anti-snagging device broken and in section.
Figure 4:
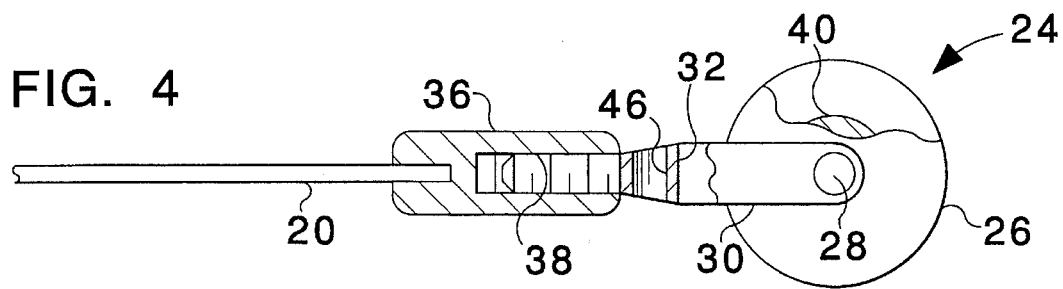
FIG. 4 is an elevation of the mounted anti-snagging device shown in FIG. 3.

FIGS. 2–3 illustrate the "fish tape" wire 20 and mounting of the anti-snagging device 24 thereon in greater detail.

The anti-snagging device 24 comprises a roller 26, which is preferably in the form of a sphere. The roller 26 is journaled on an axially disposed pin 28 that extends between the arms of a yoke 30. The arms of the yoke 30 extend to a base portion 32. A stem 34 projecting centrally from the yoke 32 and the arms of the yoke 30 in a direction normal to the pin 28.

The "fish tape" wire illustrated in FIGS. 2–3 is provided, at its free, leading end, with a mounting cylinder 36. The mounting cylinder 36 is provided with a longitudinal, threaded bore 38, the axis of which is aligned with the center of the cross section of the wire 20. The stem 34 is threaded into the bore 38 to mount the anti-snagging device 24 on the leading end of the "fish tape" wire 20.

In use, the "fish tape" wire 20, with the anti-snagging device 24 forming its leading end, is inserted into a conduit an is advanced therethrough by feeding additional portions of the "fish tape" from the entry end of the conduit. FIG. 8 illustrates the "fish tape" wire 20 being fed into a compositely formed conduit C. The conduit C includes a joint between conduit sections that produces a sharp edge E on which the leading ends of conventional "fish tapes" snag. It will be seen the roller 26 simply rides over this sharp edge, so that the "fish tape" wire can be readily and easily advanced through the conduit.

At this point it will be noted that jointed conduit C is illustrative of only one of many possible conduit constructions that would create a sharp edge, or other discontinuity along the length of the interior surface of the conduit, that the present anti-snagging device 24 "rides over" or otherwise passes through or across in avoiding interruptions to feeding of the "fish tape". One other conduit configuration to be mentioned is a bend, or sweep. The present anti-snagging device 24 readily "rides" around such a curvature in the conduit passage, overcoming prior problems in feeding conventional "fish tapes".

FIG. 9 illustrates the "fish tape" wire 20 and anti-snagging device 24 projected beyond the opposite end of the conduit C. When this position is reached, electrical conductors can be secured thereto and then installed in the conduit by retracting the "fish tape" back to the entry end of the conduit.

Attachment of the electrical wires to the "fish tape" is facilitated by provision of a central, circumferential groove 40. FIG. 9 illustratively shows three electrical conductors ec attached to the anti-snagging device 24. This may be done by stripping the insulation away so that the copper wire of one conductor may be wrapped in and around the groove 40 and then twisted into mechanical connection with the wires of the other conductors. Preferably, the wires are loosely secured relative to the groove 40 so that the roller 26 will be able to rotate on the pin 28.

After attachment of the electrical conductors ec to the anti-snagging device 25, the "fish tape" wire is retracted through the conduit C from the entry end thereof. When the anti-snagging device 24 clears the entry end, the electrical conductors ec are disconnected therefrom to complete their installation in the conduit.

In attaching the electrical connectors ec to the anti-snagging device 24, it is important to avoid the creation of any protrusions that would snag or otherwise impede retraction of the "fish tape" wire 20 back to the entry end. It is therefore a preferred practice to wrap the twisted portions of the electrical connections with a flexible, adhesive tape. Such adhesive tape is typically formed of black polyethylene film and commonly referenced as "electrical tape". The tape wrapping (made before retraction of the "fish tape") is illustrated in FIGS. 10 and 11 and identified by reference character 42.

It is to be appreciated that the roller 26 "rolls over" and avoids snagging on obstructions in the conduit when the "fish tape" is being retracted, in the same fashion as when the "fish tape" is initially advanced through the conduit C.

It will be apparent to one skilled in the art that the improved "fish tape" having the anti-snagging device 24 at its leading end can be used to install electrical conductors, or other elongated items, in various types of conduits, in essentially the same fashion as with conventional "fish tapes". This is to point out, for example, the a single electrical conductor, or even more electrical conductors could be attached to the anti-snagging device 24 for installation. Alternatively, where the conductor to be installed is heavy and/or stiff, a cord can be secured to the anti-snagging device 24 and retracted through the conduit C. The heavy conductor can then be secured to cord and the cord then employed to pull the conductor through the conduit to install it therein.

It is also to be appreciated that it is also possible to install elongated items by securing them, as by the use of "electrical tape", to the "fish tape" wire 20 adjacent to the anti-snagging device 24, before inserting the "fish tape" into the entry end of the conduit. The "fish tape" is then fed to and beyond the exit end of the conduit. The "fish tape" can then be detached from the elongated item and retracted from the entry end of the conduit. As this is done, the elongated item is restrained so that it remains in its installed position.

In summary, the anti-snagging device 24 does not alter the manner in which the "fish tape" is used, instead, it makes such use easier and less time consuming by minimizing, if not eliminating, snagging and jamming of the "fish tape" as it is fed into and then retracted from a conduit.

Figure 5:
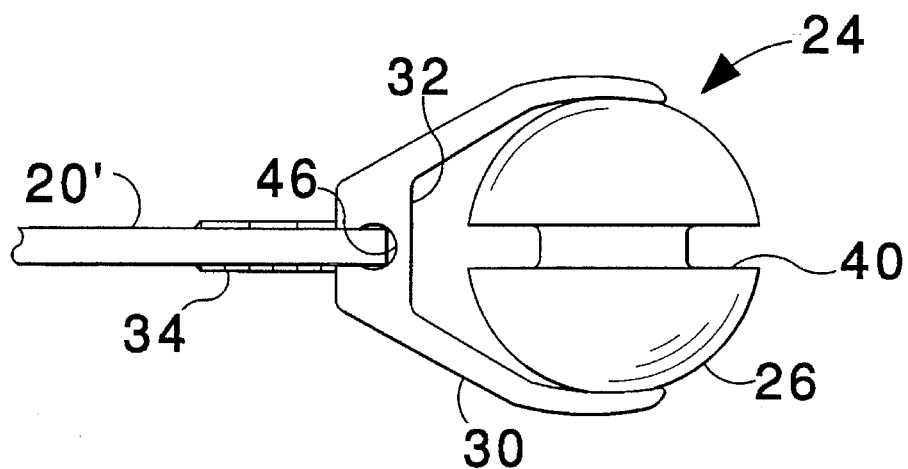
FIG. 5 is a plan view of the anti-snagging device positioned to be mounted on the leading end of a different type of "fish tape"
Figure 6:
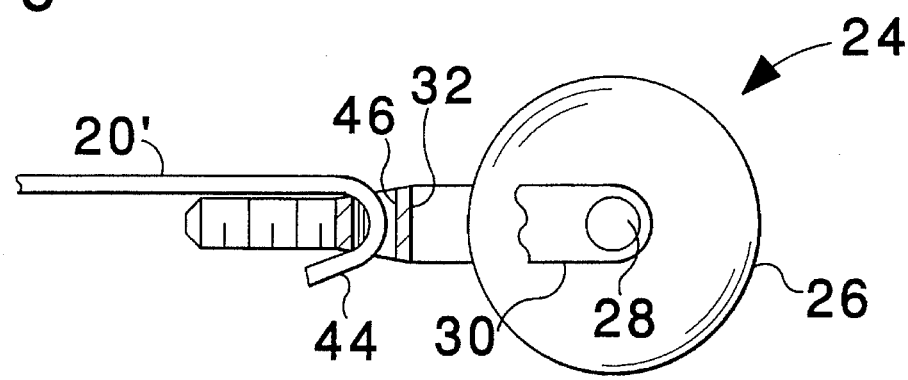
FIG. 6 is an elevation of the anti-snagging device as it is illustrated in FIG. 5.
Figure 7:
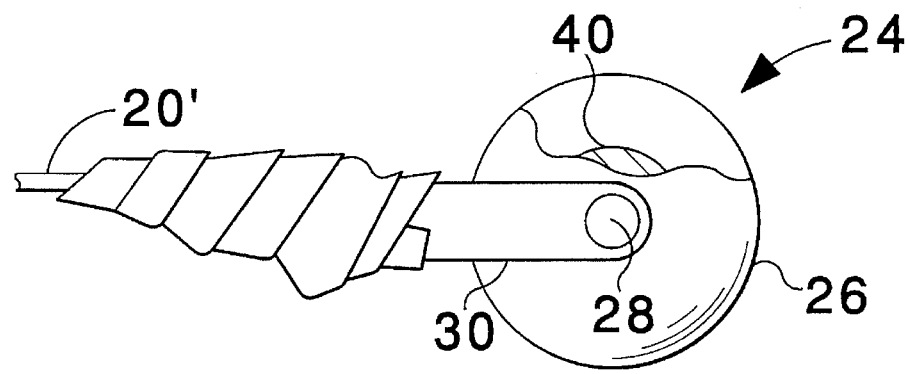
FIG. 7 is an elevation of the anti-snagging device, seen in FIG. 6, after completion of its mounting on the "fish tape"

FIGS. 5–7 illustrate another widely accepted form of "fish tape" wire 20'. The wire 20' varies from the previous described "fish tape" wire 20, in that its leading end is defined by a hook portion 44. The anti-snagging device 24, seen in FIGS. 5–7 may be identical with the anti-snagging device previously described.

The hook portion 44 is inserted through and engaged with a hole 46 formed in the bridge 32 of the yoke 30. The hole 46 is thus disposed in longitudinal alignment with the center of the roller 26. The stem 34 is disposed in alignment with the "fish tape" wire 20'. The stem 34 is then bound, in this aligned relation, to the wire 20", as illustrated in FIG. 7, by a winding of "electrical tape" (reference preceding discussion), indicated at 48.

The hook connection (44, 46) provides a strong, mechanical connection for the transmission of longitudinal forces between the anti-snagging device 24 and the wire 20' as the "fish tape" is advance through and retracted from the conduit means. The tape winding 48 is stressed in a lengthwise sense (relative to the direction of the tape) in resisting any tendency of the anti-snagging device to swivel from its aligned relation with the wire 20' when the "fish tape" is advanced through a conduit.

The manner of use of the embodiment of FIGS. 5–7 and the uses to which it can be put are the same as those discussed in connection with the first embodiment.

It is to be appreciated that the anti-snagging device 24 could be permanently attached to a "fish tape" wire, rather than being detachably mounted, as herein described. The provision of means for detachably mounting the anti-snagging device is preferred in that it is preferred to employ the largest size roller 26 in order to minimize the possibility of the a snag occurring when the "fish tape" is fed through a conduit.

This is to point out that it is contemplated that various sizes of anti-snagging devices 24 will be provided as separate items of commerce. The user of the "fish tape" will then select the size most appropriate for the size of conduit in which electrical conductors, or other elongated items, are to be installed.

Variations in the preferred embodiments herein described will occur to those skilled in the art within the scope and spirit of the present inventive concepts, and will be within the protection afforded by the following claims.

Having thus described the invention, what is claimed as novel and desired to be secured by Letters Patent of the United States is:

1. A "fish tape" for installing electrical conductors and other elongated items in protective conduits, said "fish tape" comprising a wire adapted to be inserted through the conduit from an entry end to an exit end and then retracted from the exit end to the entry end in the installation of an elongated item, characterized by an anti-snagging device comprising roller means mounted on the "fish tape" tape wire and forming the leading end of the "fish tape", said roller means being rotatable about an axis transverse to the length of the "fish tape" wire, to thereby provide a means for riding over discontinuities along the interior surface of the conduit, further characterized in that the anti-snagging device includes a yoke having arms between which the roller means is disposed and on which the roller is journaled, wherein the yoke has a central base from which said arms project, and further characterized in that the anti-snagging device comprises a stem extending from said yoke base, longitudinally of the "fish tape" wire, and further including means for securing said stem to the "fish tape" wire.

2. A "fish tape" as in claim 1 further characterized in that the means for securing the stem to the "fish tape" wire comprise a mounting cylinder secured to an end portion of the wire and having longitudinal bore aligned with the wire, and the stem of the anti-snagging device is releasably secured in said bore.

3. A "fish tape" as in claim 1, wherein the "fish tape" wire has a hook at an end portion thereof, and further characterized in that the means for securing the stem to the "fish tape" wire comprise an opening disposed centrally of said central base and through which the wire hook is engaged to provide a mechanical lock, in a longitudinal direction, between the wire and the yoke, and a tape wrapping holding the stem in alignment with the "fish tape" wire.

4. A "fish tape" for installing electrical conductors and other elongated items in protective conduits, said "fish tape" comprising a wire adapted to be inserted through the conduit from an entry end to an exit end and then retracted from the exit end to the entry end in the installation of an elongated item, characterized by an anti-snagging device comprising roller means mounted on the "fish tape" tape wire and forming the leading end of the "fish tape", said roller means being rotatable about an axis transverse to the length of the "fish tape", wire, to thereby provide a means for riding over discontinuities along the interior surface of the conduit, further characterized in that the roller means is spherical, and a groove is formed circumferential of the spherical roller means.

5. An anti-snagging device adapted to be mounted on and form the free end of a "fish tape" that is to be used in installing electrical conductors and other elongated items in protective conduits, said "fish tape" comprising a wire adapted to be inserted through the conduit from an entry end to an exit end and then retracted from the exit end to the entry end in the installation of an elongated item, said anti-snagging device comprising roller means, and means for mounting the roller means on the "fish tape" tape wire, with the roller means forming the leading end of the "fish tape", said roller means, when the device is mounted on the "fish tape" wire, being rotatable about an axis transverse to the length of the "fish tape" wire, to thereby provide a memos for riding over discontinuities along the interior surface of the conduit, further characterized by a yoke having arms between which the roller means is disposed and on which the roller is journaled, wherein the yoke has a central base from which said arms project, and further characterized by a stem extending from said yoke base, and adapted to be positioned longitudinally of the "fish tape" wire, when the anti-snagging device is mounted on the "fish tape" wire.

6. An anti-snagging device as in claim 5, adapted to be mounted on a "fish tape" having a mounting cylinder
secured to an end portion of the wire and
having longitudinal bore aligned with the wire,
further characterized in that the stem of the anti-snagging device is adapted to be releasably secured in bore of the mounting cylinder.

7. An anti-snagging device as in claim 5, adapted to be mounted on a "fish tape" having a hook at an end portion thereof, and further characterized in that the device has an opening disposed centrally of said central base and through which the wire hook is engaged to provide a mechanical lock, in a longitudinal direction, between the wire and the yoke, whereby mounting of the anti-snagging device on the "fish tape" wire may be completed by a tape wrapping holding the stem in alignment with the "fish tape" wire.

8. An anti-snagging device adapted to be mounted on and form the free end of a "fish tape" that is to be used in installing electrical conductors and other elongated items ha protective conduits, said "fish tape" comprising a wire adapted to be inserted through the conduit from an entry end to an exit end and then retracted from the exit end to the entry end in the installation of an elongated item, said anti-snagging device comprising roller means, and means for mounting the roller means on the "fish tape" tape wire, with the roller means forming the leading end of the "fish tape", said roller means, when the device is mounted on the "fish tape" wire, being rotatable about an axis transverse to the length of the "fish tape" wire, to thereby provide a means for riding over discontinuities along the interior surface of the conduit, further characterized in that the roller means is spherical, and a groove is formed circumferential of the spherical roller means.

9. A "fish tape" for installing electrical conductors and other elongated items in protective conduits, said "fish tape" comprising a wire adapted to be inserted through the conduit from an entry end to an exit end and then retracted from the exit end to the entry end in the installation of an elongated item, characterized by an anti-snagging device comprising roller means mounted on the "fish tape" tape wire and forming the leading end of the "fish tape", said roller means being rotatable about an axis transverse to the length of the "fish tape" wire, to thereby provide a means for riding over discontinuities along the interior surface of the conduit, further characterized in that the anti-snagging device includes a yoke having arms between which the roller means is disposed and on which the roller is journaled, further characterized in that the roller means is spherical.

10. An anti-snagging device adapted to be mounted on and form the free end of a "fish tape" that is to be used in installing electrical conductors and other elongated items in protective conduits, said "fish tape" comprising a wire adapted to be inserted through the conduit from an entry end to an exit end and then retracted from the exit end to the entry end in the installation of an elongated item, said anti-snagging device comprising roller means, and means for mounting the roller means on the "fish tape" tape wire, with the roller means forming the leading end of the "fish tape", said roller means, when the device is mounted on the "fish tape" wire, being rotatable about an axis transverse to the length of the "fish tape" wire, to thereby provide a means for riding over discontinuities along the interior surface of the conduit, further characterized by a yoke having arms between which the roller means is disposed and on which the roller is journaled, further characterized in that the roller means is spherical.

* * * * *